March 24, 1959     J. G. ROSS     2,878,975
MEASURING DISPENSING CONTAINER
Filed Oct. 22, 1957

INVENTOR
JOHN G. ROSS
BY Kinmel & Crowell
ATTORNEYS

United States Patent Office 2,878,975
Patented Mar. 24, 1959

2,878,975

MEASURING DISPENSER CONTAINER

John G. Ross, Dutton, Mont., assignor of forty percent to Wilfred Nadeau, Cut Bank, and twenty percent to John P. Wuerthner, Great Falls, Mont.

Application October 22, 1957, Serial No. 691,640

3 Claims. (Cl. 222—359)

The present invention relates to measuring dispensing containers and more particularly to such containers which dispense a predetermined quantity of material with each operation.

The primary object of the invention is to provide a dispensing container having means associated therewith for dispensing a predetermined quantity of material upon each operation of the invention.

Another object of the invention is to provide a dispensing container of the class described above having hand controlled means for manipulating the measuring device within the dispensing container.

A further object of the invention is to provide a dispensing container of the class described above which is inexpensive to manufacture, simple to use and which is completely effective in dispensing an exact quantity of material upon each actuation thereof.

Other objects and advantages will become apparent in the following specification when considered in light of the attached drawings in which.

Figure 1:
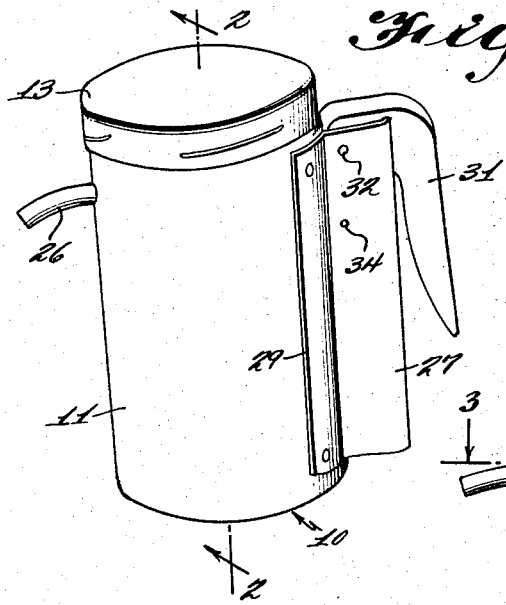
Figure 1 is a perspective view of the invention.

Referring now to the drawings in detail wherein like reference characters indicate like parts throughout the several figures the reference numeral 10 indicates generally a measuring dispensing container constructed in accordance with the invention.

The dispensing container 10 includes a generally cylindrical hollow body 11 having a reduced upper end portion 12 and a cover 13 telescopically engaged over the reduced upper end portion 12. The lower edge of the body 11 is inwardly reverted at 14 to provide the supporting edge for the body 11. A transverse bottom wall 15 is positioned in the body 11 and spaced substantially above the reverted edge 14 thereof in parallel relation thereto. The wall 15 has an axial, circular opening 16 of restricted diameter. A second circular opening 17 having a diameter the same as opening 16 extends through the wall 15 in spaced relation to the opening 16.

A hollowed dome 18 is opened at its lower end and has a pair of horizontally extending ears 19 formed thereon. The dome 18 is supported on the wall 15 with the ears 19 in contacting relation. Securing elements 20 extend through the ears 19 and through the wall 15 to secure the dome 18 in overlying relation with respect to the opening 17 in the wall 15.

A slide plate 21 is positioned beneath the wall 15 and has a cylindrical cup 22 depending therefrom opening at its upper end through the slide plate 21. The slide plate 21 has a shank portion 23 thereof extending through the body 11 and having a bore 24 formed therein. Guide clips 25 mount the slide plate 21 in contact with the lower face of the bottom wall 15 in position so that the cup 22 can be moved from a position underlying the opening 16 to a position underlying the opening 17.

A dispensing conduit 26 of generally arcuate form is secured to the upper end of the dome 18 and extends outwardly through the body 11 to provide means for dispensing material from the dome 18.

A pair of bracket plates 27 and 28 are arranged in spaced parallel relation and are provided with arcuate flanges 29, 30 respectively. The flanges 29 and 30 are secured to the body 11 in upright relation along the side thereof opposite the outlet of the conduit 26 with the shank 23 lying therebetween. The arcuate flanges 29 and 30 may be spot welded or secured by other suitable means to the body 11.

Figure 2:
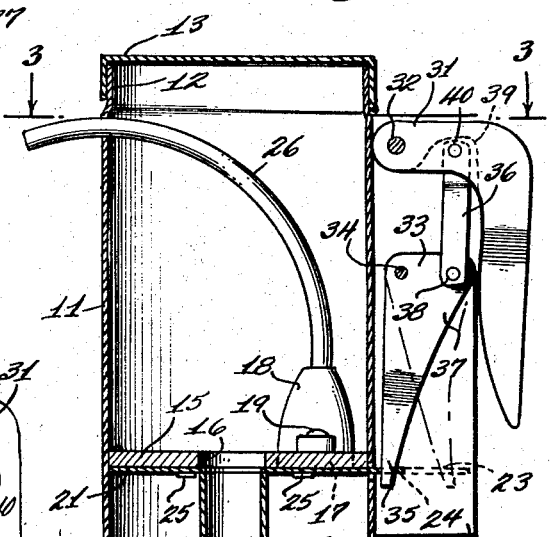
Figure 2 is a vertical cross-section taken along the line 2—2 of Figure 1 looking in the direction of the arrows.
Figure 4:
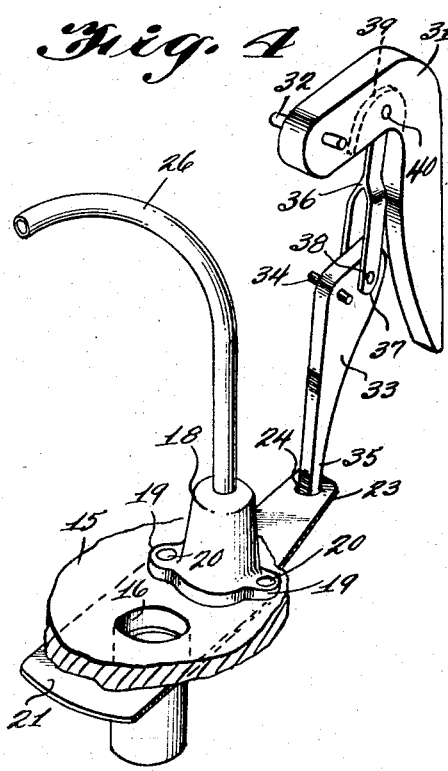
Figure 4 is a fragmentary perspective view of the dispensing mechanism shown removed from the container.
Figure 3:
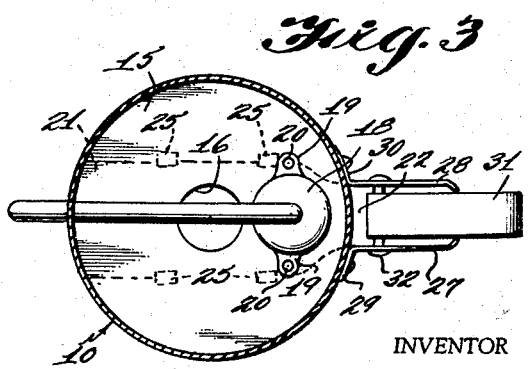
Figure 3 is a horizontal cross-section taken along the line 3—3 of Figure 2 looking in the direction of the arrows.

An L shaped handle 31 is mounted between the bracket plates 27, 28 by means of a pivot pin 32 secured to one end of the L shaped handle 31 and extending through the bracket plates 27, 28. A bell crank lever 33 is positioned below the handle 31 and pivotally mounted between the bracket plates 27, 28 by means of a pivot pin 34 secured to the bell crank lever 33 and extending through the plates 27, 28. The bell crank lever 33 has an elongated depending portion 35 which extends through the board 24 as can be clearly seen in Figures 2 and 4. A Y-shaped link 36 engages on opposite sides of a laterally extending portion 37 of the bell crank lever 33 and is pivotally secured thereto by a pivot pin 38. The upper end of the Y-shaped link 36 engages in a notch 39 formed in the bell shaped handle 31 at a point spaced from the pivot 32 and is pivotally secured therein by a pivot pin 40 extending therethru.

In the use and operation of the invention the cover 13 is removed and the body 11 is filled with either a liquid or dry material and the cover 13 is replaced. When it is desired to dispense material from the body 11 the L shaped handle 31 is pulled upwardly causing the bell crank lever 33 to swing on the pivot 34 and move the slide plate 21 so that the cup 22 moves from its position underlying the opening 16 to a position underlying the opening 17. The dispensing container 10 is then tilted to a horizontal position so that the contents of the cup 22 may be dispensed through the dome 18 and through the conduit 26. The movement of the plate 21 to move the cup 22 to underlying position with respect to the opening 17 causes a portion of the plate 21 to engage under the opening 16 preventing further material from flowing therethrough until the cup 22 is returned to its position thereunder. As can be readily seen only the contents of cup 22 can be dispensed on each operation of the device and as long as material remains in the body 11 the dispensing of material therefrom will be extremely accurate.

Having thus described the preferred embodiment of the invention it should be understood that numberous structural adaptations may be resorted to without departing from the scope of the appended claims.

What is claimed is:

1. A measuring dispensing container comprising a cylindrical body having a pair of opposed ends, a removable cover closing one end of said body, a wall positioned in spaced parallel relation to said cover adjacent the other end of said body, said wall having a pair of openings extending therethrough, a slide plate positioned below and said wall, a measuring cup depending from and communicating through said slide plate and arranged for movement therewith from a position underlying one of said openings to a position underlying the other of said openings, a hollow dome having an open side overlying one of said openings, said dome being fixedly secured to said wall, a dispensing conduit secured to and communicating with the interior of said dome and extending outwardly through said body, and handle means mounted on said body for moving said slide plate and said cup with respect to said openings whereby said cup may be selectively positioned beneath said openings to selectively communicate said cup with said container and with said dome.

2. A device as claimed in claim 1 wherein said slide plate has a shank extending laterally therefrom through said cylindrical body and the means moving said slide plate and said cup engages an opening in said shank.

3. A device as claimed in claim 1 wherein the means for moving said slide plate and said cup includes a pivoted handle, a pivoted bell crank lever, with said bell crank lever having a portion thereof engaging said shank, and a link having one end thereof pivotally secured to said handle and the other end thereof pivotally secured to said bell crank lever whereby pivotal movement of said handle will pivot said bell crank lever moving said slide plate and said cup.

References Cited in the file of this patent

UNITED STATES PATENTS

| | | |
|---|---|---|
| 754,230 | McIntyre | Mar. 8, 1904 |
| 954,782 | Condon | Apr. 12, 1910 |
| 1,872,650 | Berger | Aug. 23, 1932 |
| 2,169,239 | Hacmac | Aug. 15, 1939 |